United States Patent [19]

Chen et al.

[11] Patent Number: 4,778,084

[45] Date of Patent: Oct. 18, 1988

[54] TOOTHPASTE DISCHARGER

[76] Inventors: James C. Chen, Room 10, 12th Floor, No. 610, Tun-Hua South Road, Taipei; Ching-Hua Chen, 3rd Floor, No. 103, Sec. 1, Huan-Ho City, Taipei Hsien, both of Taiwan

[21] Appl. No.: 932,529

[22] Filed: Nov. 20, 1986

[51] Int. Cl.⁴ .............................................. B67D 5/06
[52] U.S. Cl. .................... 222/185; 222/181; 222/327; 222/391; 222/505; 222/511; 222/545; 222/561
[58] Field of Search ............... 222/185, 390, 391, 207, 222/511, 105, 96, 327, 505, 545, 469, 561

[56] References Cited

U.S. PATENT DOCUMENTS

| | | | |
|---|---|---|---|
| 2,187,256 | 1/1940 | White | 222/505 |
| 2,570,755 | 10/1951 | Booth | 222/96 |
| 2,726,016 | 12/1955 | Anderson, Jr. | 222/511 X |
| 2,849,165 | 8/1958 | Wandel | 222/505 |
| 4,437,591 | 3/1984 | van Shuckmann | 222/391 |
| 4,506,810 | 3/1985 | Goncalves | 222/391 |
| 4,522,317 | 6/1985 | Goncalves | 222/391 |
| 4,643,337 | 2/1987 | Heck et al. | 222/391 X |
| 4,702,399 | 10/1987 | Davis | 222/390 |

FOREIGN PATENT DOCUMENTS 1921427  11/1970  Fed. Rep. of Germany ...... 222/105
3005925   9/1981  Fed. Rep. of Germany ...... 222/207

Primary Examiner—Joseph J. Rolla
Assistant Examiner—Gregory L. Huson
Attorney, Agent, or Firm—Cushman, Darby & Cushman

[57] ABSTRACT

A toothpaste discharger comprises a container having a projected mouth at the lower portion and a socket behind the mouth, the socket being bored two holes at two side walls of the socket and an aperture at the top wall thereof, a washer inserted within the container, the washer being provided with an aperture approximately at the center thereof, and a driving means comprising a driving arm, a toothbrush receiving portion integrally under the driving arm, a pin at the top of the driving arm the pin extending with two flanges thereof within two holes of the socket, an elastic connecting portion in front of the pin, a driving rod connected onto the elastic connecting portion by means of a plug to extend into the container, a resilient element behind the pin to bias against the back portion of the socket, and a tongue portion pivoted on the driving arm to close the projected mouth in normal position.

3 Claims, 6 Drawing Sheets

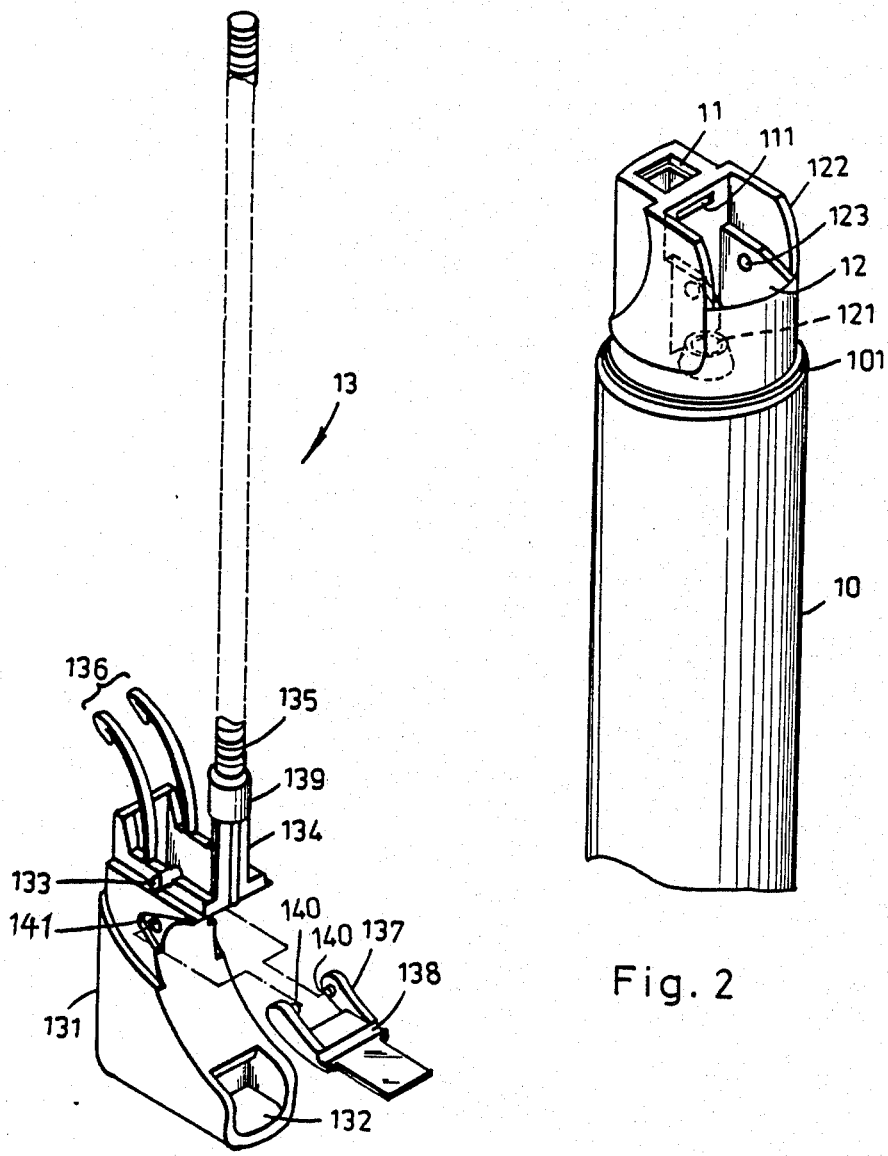

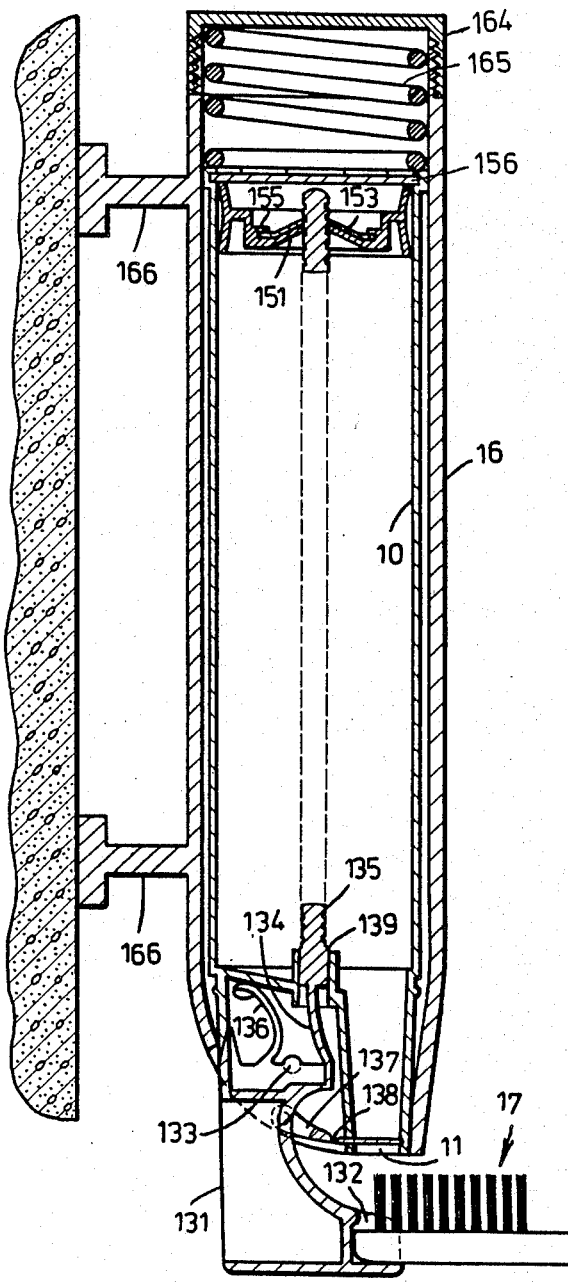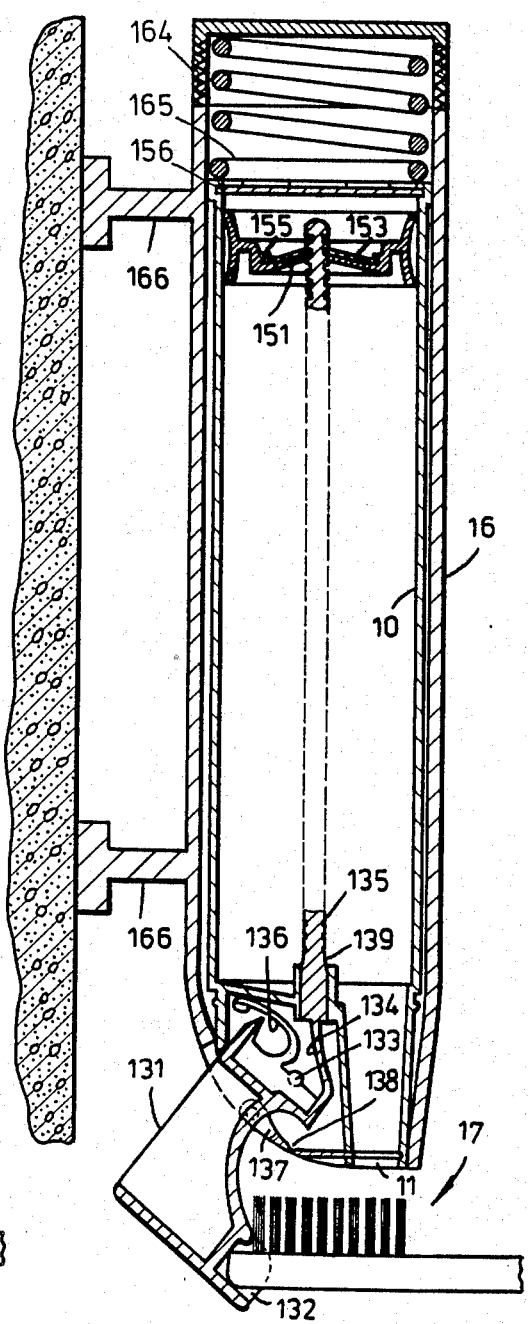

TOOTHPASTE DISCHARGER

FIELD OF THE INVENTION

This invention relates to a toothpaste discharger, more particularly to one which provides a brush receiving portion for the brush to extend therein and simutaneously drive the toothpaste to flow out and coat on the bristle of the toothbrush.

BACKGROUND OF THE INVENTION

Conventionally, the most relevant art to the preferred embodiments of this invention is one which comprises a container having a projected mouth at the higher portion and a socket behind the mouth, two holes are bored at two side walls of the socket and an aperture is provided at the top wall thereof. A washer is inserted within the container, the washer is being provided with an aperture approximately at the center thereof. A driving means comprising a finger pushing portion and a pin below the finger pushing portion is provided. The pin extending two flanges thereof within two holes of the socket. An elastic connecting portion is located in front of the pin. A driving rod is connected to the elastic connecting portion by means of a plug to extend into the container. A resilient element is provided behind the pin to bias against the back portion of the socket. When the user holds the container with one hand and pushes the finger pushing portion, the toothpaste will flow out to coat on the bristle of the toothbrush which is held by the other hand.

The conventional art as set forth requires the hand which holds the container to extend one finger to push the finger pushing portion. It means that two hands are required to use the conventional toothpaste discharger.

To obviate the defects of the above conventional art, one object of this invention is to provide a brush receiving portion for the brush to extend therein and simultaneously drive the toothpaste to flow out and coat on the bristle of the toothbrush with one hand only.

Another object of this invention is to provide a preferred embodiment which further comprises a fixing means capable of being secured onto the wall. The fixing means may be integral with or independent of a container of this invention. In this case, one hand alone is required to use this invention.

Still another object of this invention is to provide a preferred embodiment of which further comprises a tongue portion pivoted on the driving arm to extend into the projected mouth to prevent the intrusion of the foreign material or insects.

SUMMARY OF THE INVENTION

This invention relates to a toothpaste discharger which comprises a driving means with a toothbrush receiving portion for the toothbrush to extend therein whereby the toothpaste may be pressed out.

The toothpaste discharger is also equipped with a tongue portion to stop the projected mouth when the toothpaste discharger is in a normal position.

Other objects, merits and a fuller understanding of the present invention will be obtained by those having ordinary skill in the art when the following detailed descriptions of the best mode contemplated for practicing the invention is read in conjunction with accompanying drawings wherein like numerals refer to like or similar parts and in which:

BRIEF DESCRIPTION OF THE DRAWING

FIG. 2 is a perspective view of a preferred embodiment of this invention upside down and partially taken away;

FIG. 3 is a perspective view of a driving means as shown in FIG. 1;

FIG. 7 is a sectional view of FIG. 5 in combination with a brush in a normal position;

FIG. 8 is a sectional view of FIG. 5 in combination with a brush in an operating position.

BRIEF DESCRIPTION OF THE PREFERRED EXEMPLARY EMBODIMENT

This invention relates to a toothpaste discharger, and more particularly to a toothpaste discharge which provides a brush receiving portion for the brush to extend therein and simultaneously drive the toothpaste to flow out and coat on the bristles of the toothbrush.

Figure 1:
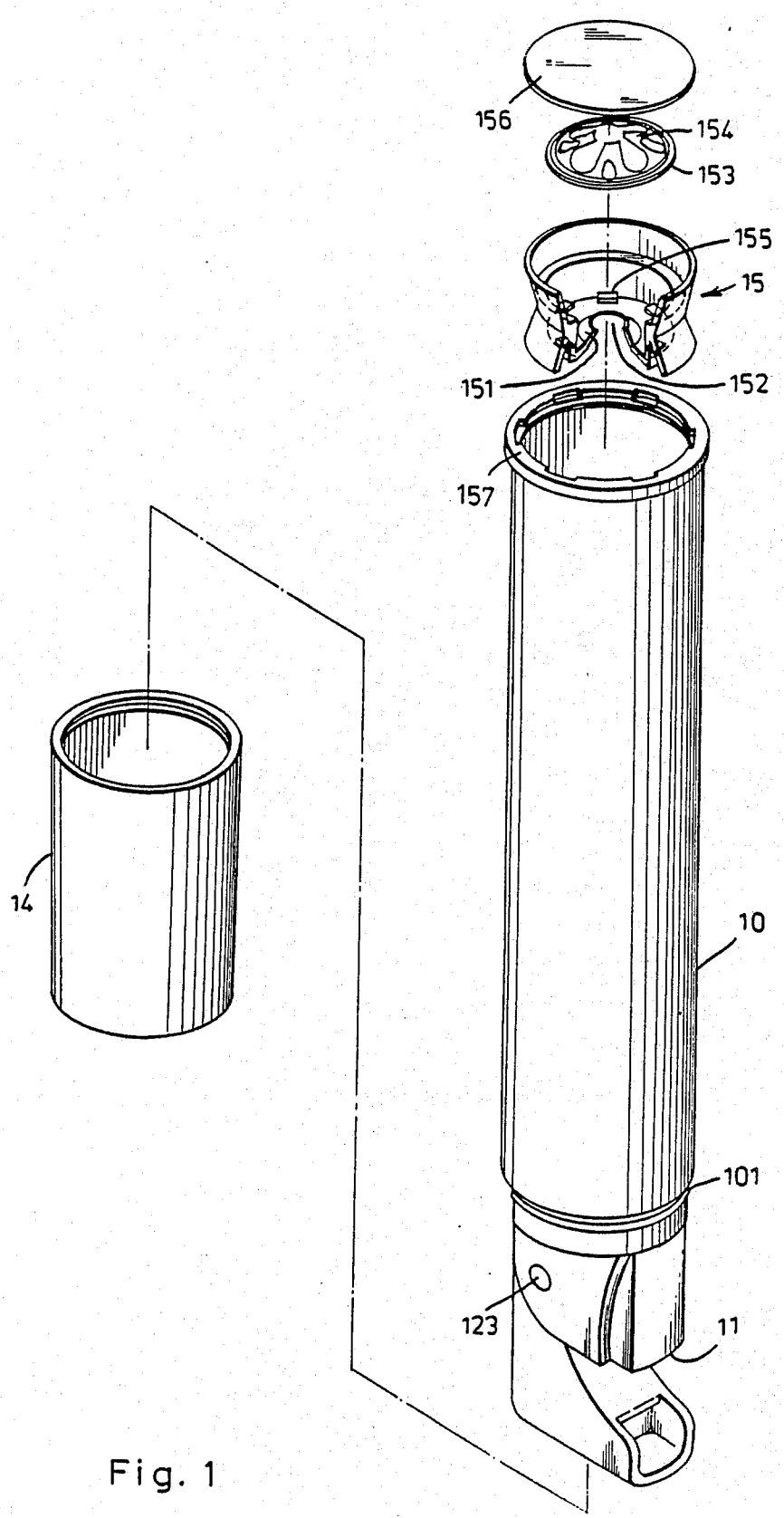
FIG. 1 is a perspective view of a preferred embodiment of this invention partially dissembled.

As shown in FIG. 1, 2 & 3, a tube shaped container 10 according to a preferred embodiment of this invention has a projected mouth 11 at the lower portion thereof and a socket 12 behind the mouth 11. The mouth 11 extends downward from the bottom of container 10 further than the side walls of the socket 12. The cross section of the mouth 11 is beyond the center of the bottom of the container 10 while the cross section of the socket 12 covers the center of the bottom of the container 10. An aperture 121 is bored into the top wall of the socket 12 so that the socket 12 and the container 10 may communicate with each other. The aperture 121 is approximately at the center of the circle defined by the bottom of the container 10. The socket 12 has two opposite walls 122 extending from the longitudinally middle portion of the mouth 11. On the two opposite walls 122 of the socket 12 two holes 123 are respectively bored. Behind the lower portion of the mouth 11 a slot 111 is provided.

Figure 4:
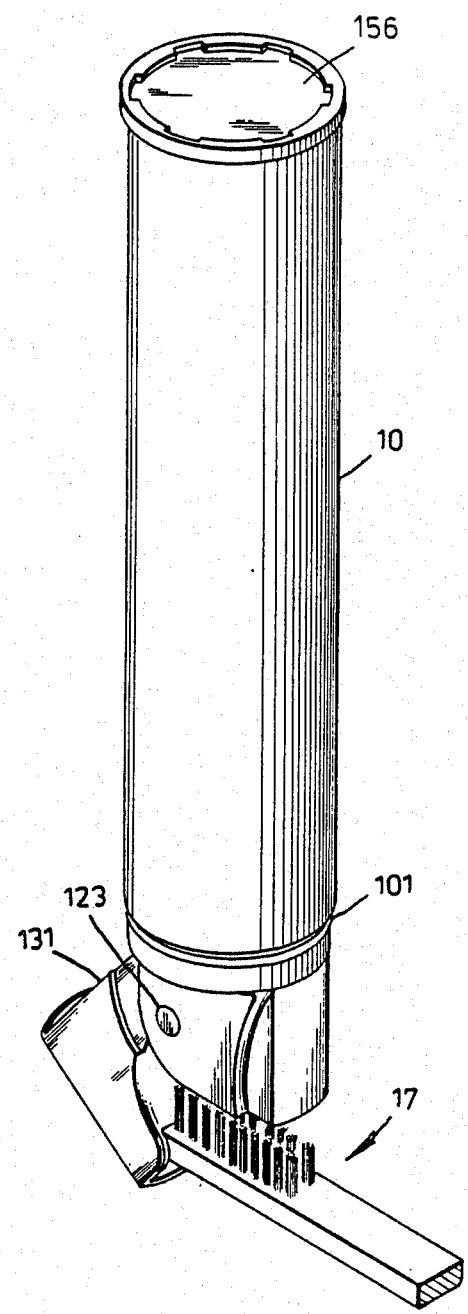
FIG. 4 is a sectional view of FIG. 1 in combination with a brush in operating position.

Still as shown in FIG. 1 2 & 3, a driving means 13 according to a preferred embodiment of this invention comprises a driving arm 131, a brush receiving portion 132 integrally under the driving arm 131, two flanges 133 at the top of the driving arm 131 to form a pin. An elastic connecting portion 134 is disposed horizontally in front of the flanges 133 and a driving rod 135 is connected onto the elastic connecting portion 134. The driving rod 135 is threaded at its top. A resilient element 136 is disposed horizontally behind the flanges 133 to bias against the back portion of the socket 12. A tongue portion 137 is pivoted on the driving arm 131 to extend into the slot 111 and the projected mouth 11. Two pivoting holes 141 are provided on the upper portion of the driving arm 131. Two pivoting rods 140 are provided on the rear end of the tongue portion 137 whereby the tongue portion 137 may be pivoted on the driving arm 131. The tongue portion 137 preferably has a bent portion 138 in the middle to increase the elasticity thereof. With the provision of the tongue portion 137, the foreign material or insects will be prevented from invading the toothpaste discharger when this invention is in a normal position. In use, the tongue portion 137 will release from the slot 111 and the projected mouth 11. The driving rod 135 is connected onto the elastic connecting portion 134 by means of a plug 139 to fit into the aperture 121 of the socket 12. The driving rod 135 is preferably provided with thread thereon to increase the amount of friction. As shown, the container 10 may be provided with a thread portion 101 approximately at the connecting portion between the container 10 and the mouth 11 or socket 12 for a lower cap 14 to fasten thereon. A washer 15 is provided which has a longitudinally convex portion 151 in the middle thereof. On the center of the convex portion 151 an aperture 152 is bored to allow the driving rod 135 to extend freely therethrough. A convex disc 153 comprising a plurality of resilient plates 154 independent of one another to define an opening slightly smaller in diameter to the aperture 152 is mounted on the convex portion 151 and held firmly thereon by means of plurality of clamps 155 provided along the inner circumference of the washer 15. The washer 15 is inserted within the container 10 with the convex portion 151 pointing upward. And above the washer 15 a cover 156 is provided to stop the upper end of the container 10. The upper end of the container 10 is provided with a plurality of ear portions 157 to prevent the cover 156 from releasing. In assembly, the tongue portion 137 is first inserted into the slot 111 and the projected mouth 11, then extend with the driving rod 135 through the aperture 121 of the socket 12 into the container 10 and further through the aperture 152 of the washer 15, finally the flanges 133 are inserted within the two holes 123. Because the driving rod 135 is threaded when a toothbrush 17 as shown extends into the toothbrush receiving portion 132 it will pull down the driving rod 135, engage with the inner circumference of the aperture 152 and pull the washer 15 downward as a result of which the toothpaste within the container 10 will be pressed down through the projected mouth 11. For better understanding, FIG. 4 is presented to show the operating position of a preferred embodiment of this invention.

Figure 5:
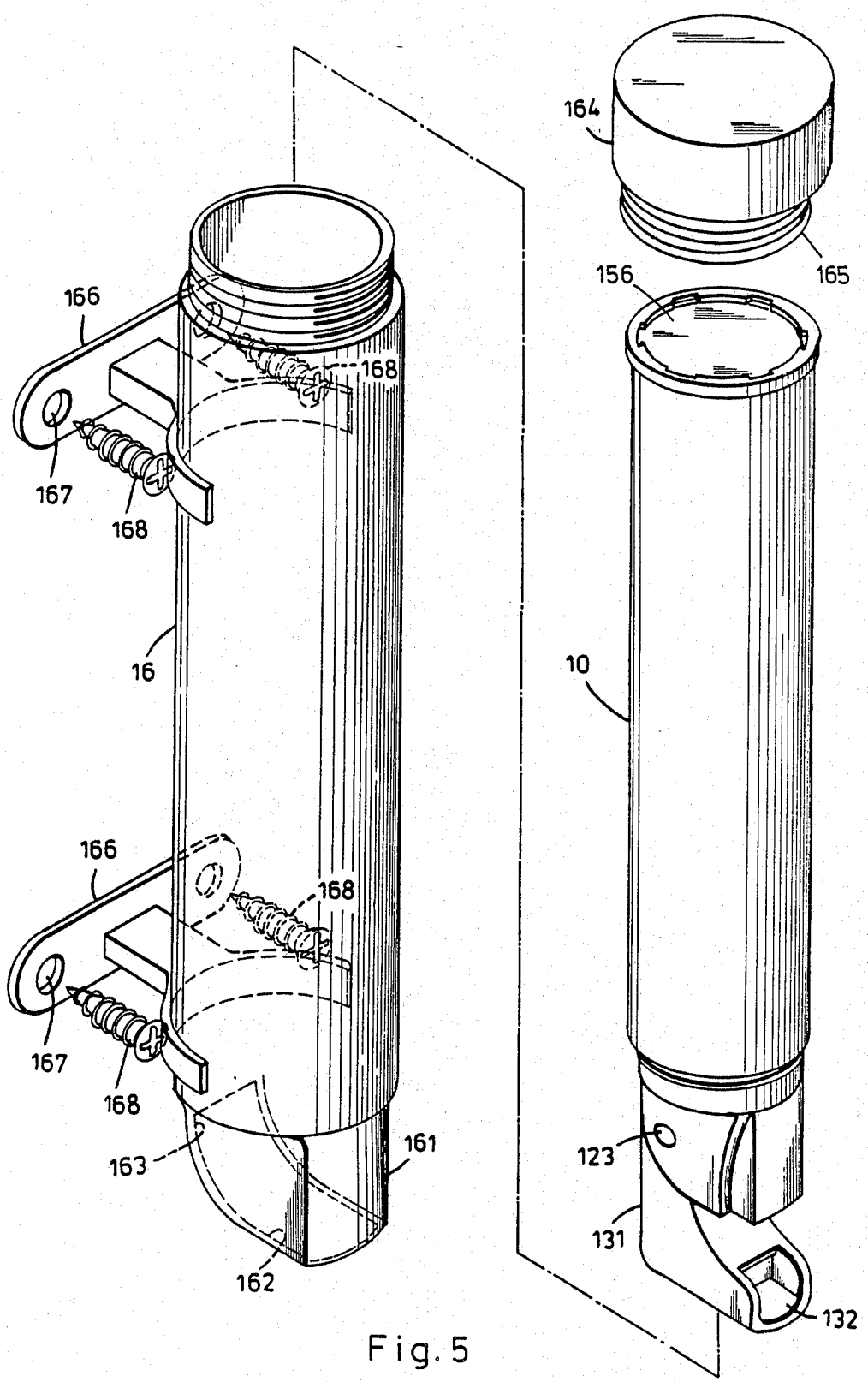
FIG. 5 is a perspective view of another preferred embodiment of this invention.
Figure 6:
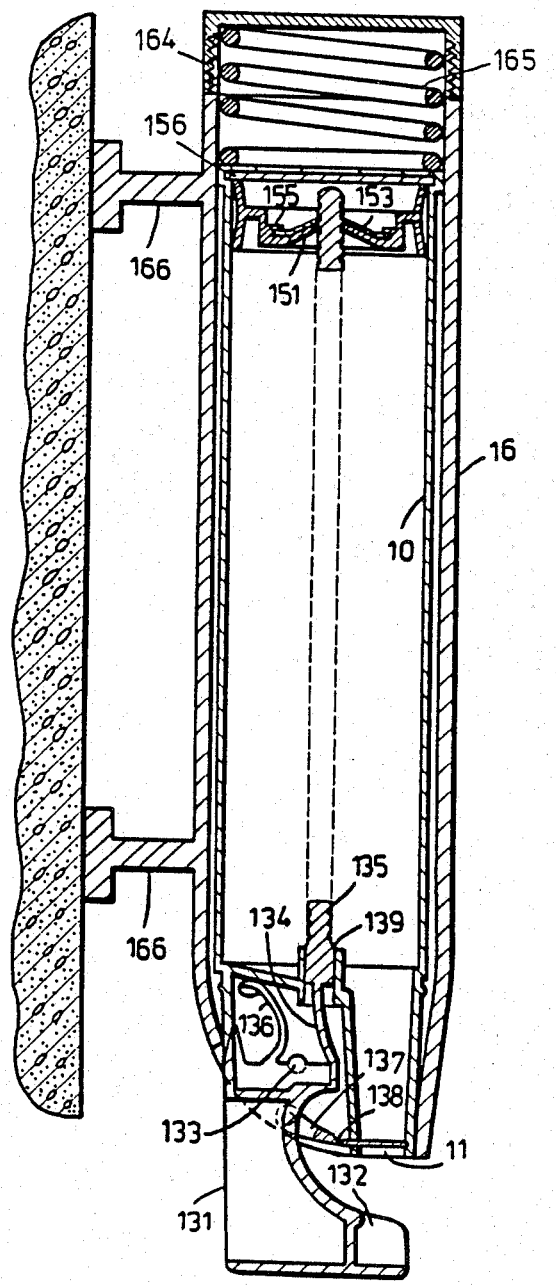
FIG. 6 is a sectional view of FIG. 5.

FIG. 5, 6, 7 & 8 shows another preferred embodiment of this invention wherein an outer casing 16 is further provided. The outer casing 16 has an anvil shaped portion 161 at the lower end thereof. The bottom of the anvil shaped portion 161 is an oblong opening 162 and one of the short side walls of the anvil shaped portion 161 is a vertical cleft 163. The oblong opening 162 allows the driving arm 131 to extend through and the vertical cleft 163 allows the driving arm 131 to move. The upper portion of the outer casing 16 is threaded to receive an upper cap 164 to fasten thereon. A tension spring 165 is secured onto the top of the upper cap 164. The tension spring 165 presses against the top of the container 10. Two brackets 166 are connected to or integrally made with the outer casing 16. Each bracket 166 are bored with at least two screw holes 167 for means 168 to secured the outer casing 16 on the wall. In using this preferred embodiment of this invention, one hand alone is required. For better understanding, FIG. 7 & 8 are provided to show respectively the normal position and operating position of this preferred embodiment of this invention.

It is to be noted that the above description attempts to explain however not limit the concept of this invention.

What is claimed is:

1. A toothpaste discharger for discharging toothpaste onto a brush comprising:
    a substantially rigid barrel having a first end and a second end, the barrel containing the toothpaste therein;
    a driving arm, having a brush receiving portion, pivotally connected to the first end of the barrel;
    means for driving the toothpaste onto a toothbrush, the driving means being activated by the pivoting from a first position to a second position of the driving arm by the brush in the brush receiving portion; and
    a tongue portion pivotally mounted on the driving arm and extending over the brush receiving portion and closing an outlet from the barrel when the driving arm is in said first position.

2. A toothpaste discharger as in claim 1 wherein said driving means includes a driving rod within the barrel having one end in communication with the driving arm so that the driving rod is moved from a first position to a second position in response to the pivoting of the driving arm.

3. A toothpaste discharger as in claim 2 further comprising a mouth disposed between the first end of the barrel and the driving arm, the mouth having a pivot aperture around within which the driving arm pivots

* * * * *